Patented May 3, 1927.

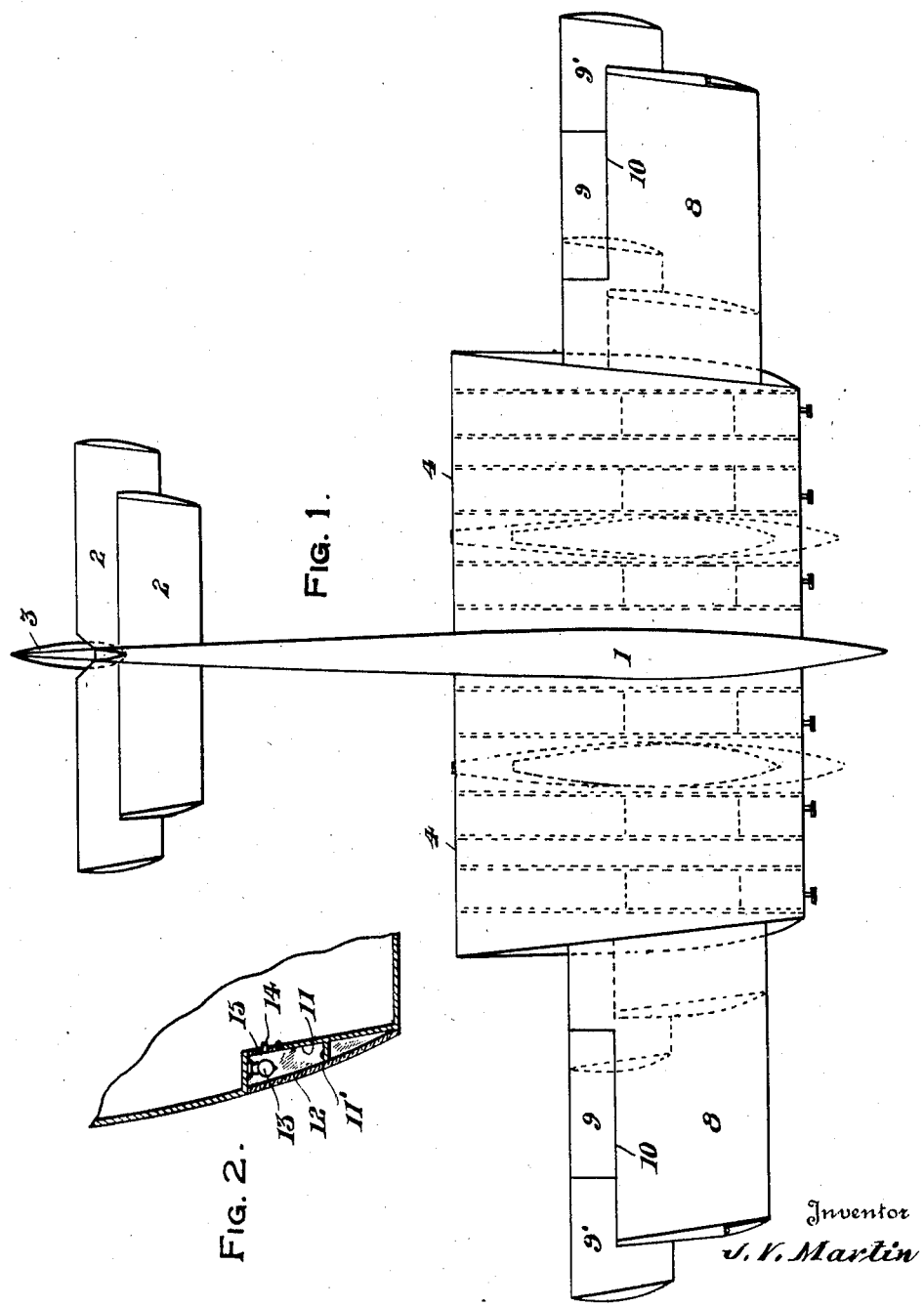

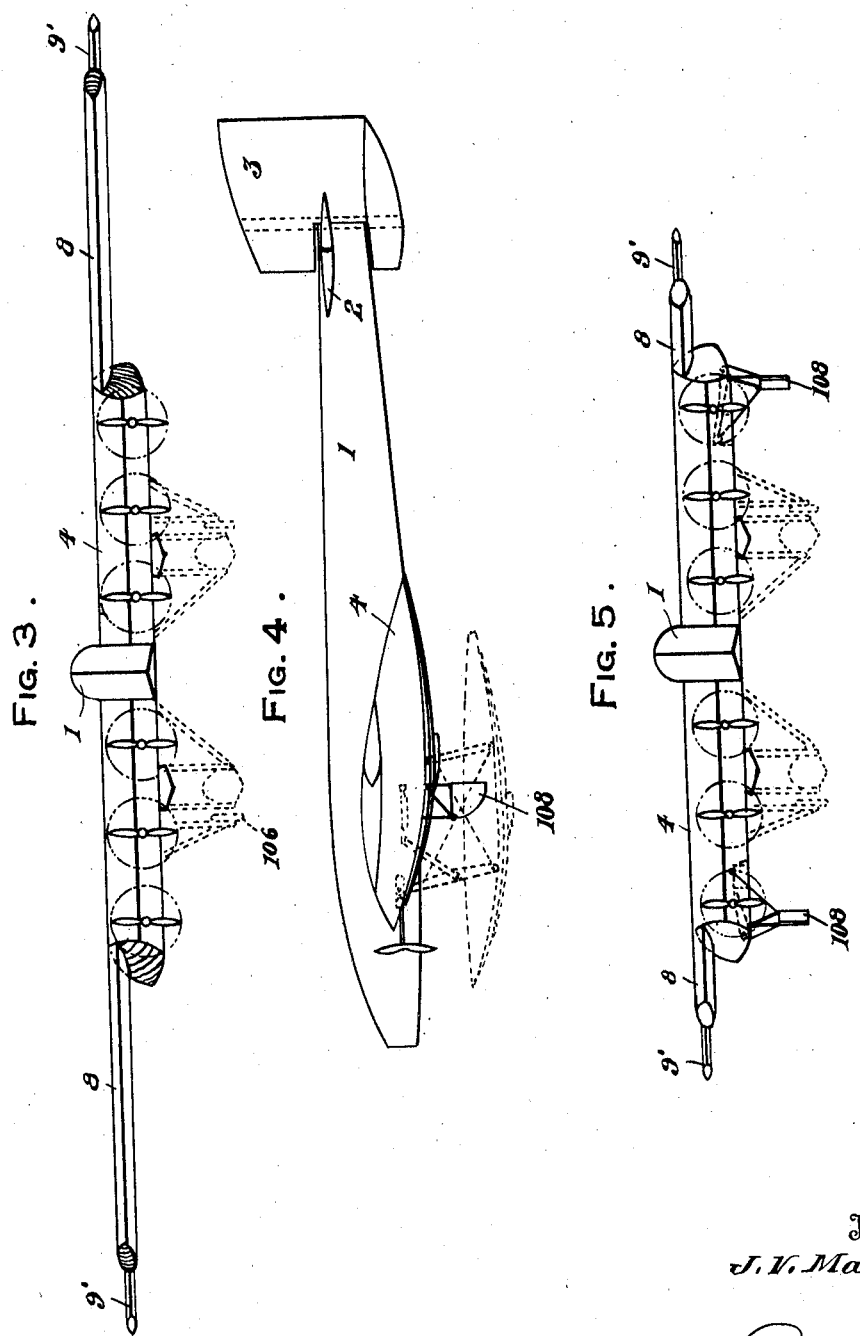

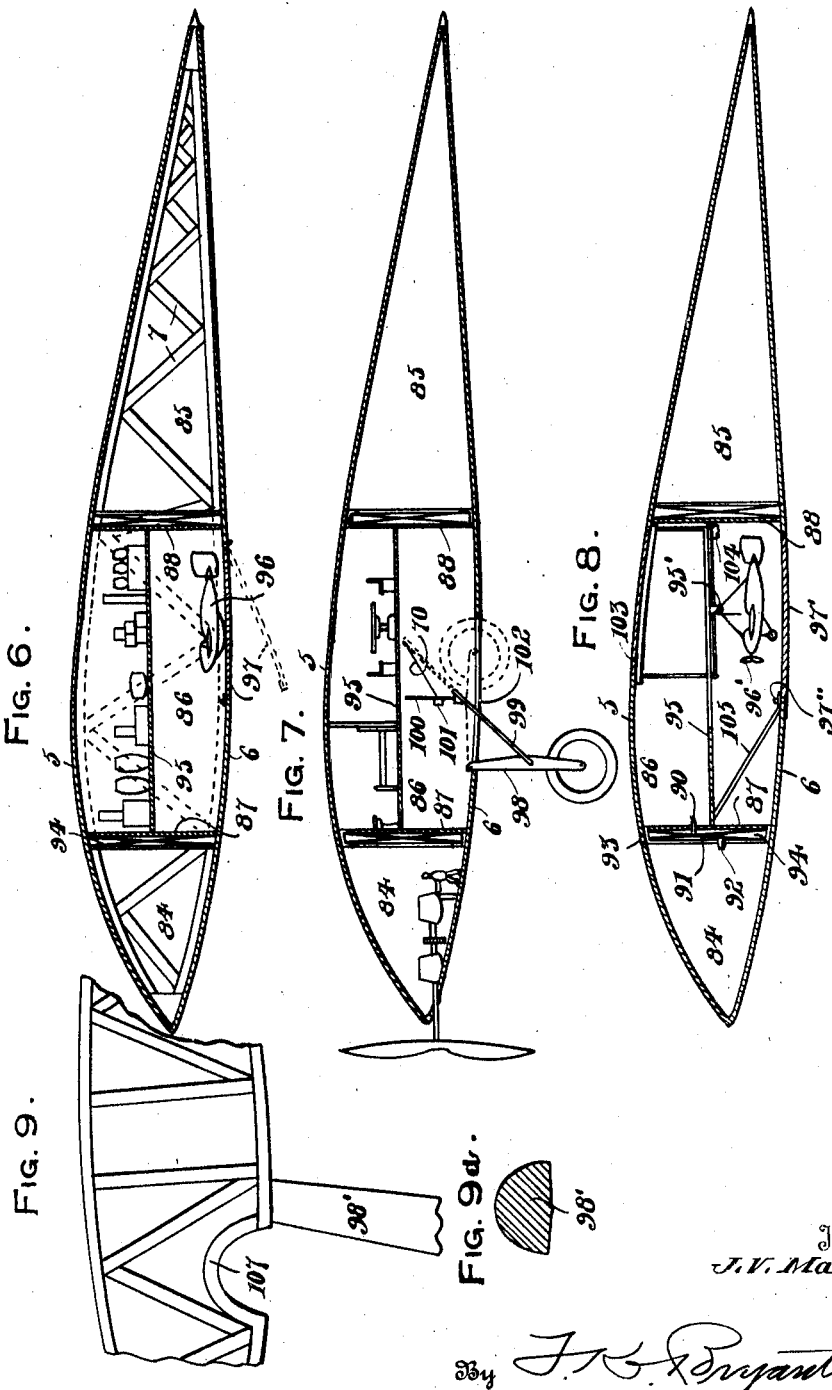

1,627,191

UNITED STATES PATENT OFFICE.

JAMES V. MARTIN, OF GARDEN CITY, NEW YORK.

AEROPLANE-WING STRUCTURE.

Original application filed March 5, 1921, Serial No. 450,034. Divided and this application filed August 14, 1922. Serial No. 581,702.

It is not a novel conception to house various motors, tanks, people and cargo within the upper and lower skin of an aeroplane wing, but to produce a design wherein these and other elements of the aeroplane are housed within a form of wing having a high lift drift value and a practical, internal trussing system is the object of this invention. With this as the principal object, the more detailed objects of this invention are as follows:

To produce a wing combination of high lift drift values which can be readily reduced in area during flight without weakening the internal truss of the aeroplane.

To create a combination of two or more aerofoils so juxtaposed that the interference of one wing upon the other shall increase the efficiency of one wing without a corresponding decrease of efficiency upon the other, or in other words, so that the sum of the interference shall be more helpful than harmful, i. e., beneficial interference.

To provide within the wing of an aeroplane a support for mail, parcel, or bomb so designed that any of the said articles may be released and allowed to drop out of both their support and the wing to which the support is secured.

To provide an efficient aeroplane wing of such strength and proportions that it will accommodate within its upper and lower skins, smaller aeroplanes and gliders and to adapt said wing as a suitable starting and alighting place for said aeroplanes.

To provide a life preserver glider and store same within the wing with rapid detachable gear so that in case of fire or other danger, the passengers may exit from the wing and glide to a field or to the water where the said glider will float until assistance arrives.

To provide a form of internal truss designed to perform the double function of a truss and a partition dividing sleeping and dining rooms from engine rooms and the like.

To provide a circulation system for large aeroplane wings designed to circulate the air naturally and freely to the various sleeping, eating, storing and other compartments of the aeroplane.

To provide a weight distribution of cargo, power units and passengers which will reduce the stresses of flying and alighting as broadly set forth in my prior application Serial No. 294,466, filed May 3rd, 1919.

To provide special means for varying propeller velocity at high altitudes.

To provide a pressure valve and pump system for the automatic regulation of the internal wing pressure at varying altitudes.

To provide an improved form of aileron adaptable to a retractable wing.

A further object of the invention is to provide in connection with the wing end of an aeroplane, a type of side light wholly enclosed within the wing but transparent through said wing and screened from certain arcs by the said wing.

A further object of the invention is to provide an improved carriage for a servo motor adapted to retract or extend said servo motor at will.

Heretofore, wires, struts, chassis, pontoons and braces have been fitted externally to what has been called an aeroplane body, nacelle or fuselage, these members are useless aerodynamically since there is no lifting component to the resistance they create, therefore refinement has required their elimination during flight and various methods for drawing chassis and other members within the aeroplane body during flight, have been proposed and actually accomplished.

However, the body resistance is also of the useless character called parasite resistance and therefore in the more refined aeroplanes of the future, the designer must face the double problem of retaining continuity and proportion of a wing truss positioned between the upper and lower skins of the wing and at the same time so shaping and disposing the chassis and other retractable parts that these can be drawn within the wing without interfering with the truss which is essential to the strength of the wing structure. Therefore, the combination of parts such as retractable chassis, with a wing structure, are distinctively inventive disclosures of the greatest usefulness to the advancing art.

The drawings indicate the internally trussed type of wing possessing wing bars and ribs as indicated, so spaced and formed that the intervening spaces become available and adapted to accommodate the chassis when retracted and housing for the power units. Also, double use has been made of the rib and spar truss to support the partitions 87 and 88 which separate various rooms and compartments in the aeroplane from others and prevent noises and fumes from the engine room reaching the passenger and radio quarters.

These and other objects of the invention will become apparent from the following detail disclosure in connection with the accompanying drawings, but throughout the invention, there is one consistent purpose, i. e., to so modify and adapt the essential elements of a wing and those of the elements which are housed within the wing that a practical and efficient aeroplane will result, and as the relative motions of the parts housed within the wind are accomplished during flight, thus altering the stresses of the wing structure and changing the aeroplane balance, it is essential that the internal wing structure be embodied in practical proportions and designed to care for these and other problems which may be presented. This is a division of my copending application Serial No. 450,034.

Figure 1 is a top plan view of an aeroplane constructed in accordance with the present invention showing the retractable wing sections and the transversely positioned propellers and driving motors therefor, Figure 2 is a detail sectional view of one end of a wing section showing the signal lamp and colored covering glass plate therefor, Figure 3 is a front elevational view of the aeroplane showing the pontoons and chassis lowered in their operative positions as indicated by dotted lines, Figure 4 is a side elevational view showing the central fuselage and the lateral main plane or aerofoil section with the pontoon lowered into operative position and illustrated in dotted lines, Figure 5 is a front elevational view similar to Fig. 3 showing the outer wing sections retracted into the main aerofoil, Figure 6 is a longitudinal sectional view taken through the aerofoil showing the brace ribs and trusses, storage compartments and a smaller aeroplane housed therein also a glider located on a door hinged to the bottom surface of the aerofoil, Figure 8 shows another longitudinal sectional view of the aerofoil wherein a smaller aeroplane may alight upon the upper surface of the aerofoil for passing to the interior of the aerofoil by an elevator construction with a sliding door in the bottom surface of the aerofoil to permit the smaller aeroplane to drop through the door opening, Figure 7 shows the aerofoil construction, in a further longitudinal section, wherein a motor operated rod has a gear connection with a rack strut attached to a chassis for retracting and projecting the same relative to the aerofoil, Figure 9 is a fragmentary detail view showing the type of brace rib construction of the aerofoil with channel grooves in the lower side thereof for accommodating one of the frame struts of the chassis, and Figure 9$^a$ is a cross sectional view of the strut, showing a configuration similar to the channel groove in the rib construction of the aerofoil and the form of the groove in the under aerofoil which is closed flush by the retraction of the chassis frame.

The construction of aeroplane hereinafter described in detail provides for a main plane or aerofoil of hollow formation with the upper and lower surfaces suitably braced by ribs and wing bars, retractable wings being associated with the lateral extremities of the main aerofoil and the said retractable wings similarly formed of hollow construction and having sectional ailerons hinged thereto under control of the operator within the aerofoil for retracting the wings and the ailerons hinged thereon with the hinge sections of the ailerons being independently operable to vary the lateral control of the aeroplane during flight. Signal lamps are arranged at the extremities of the main wing sections and are so positioned as to direct the rays forwardly and laterally of the wings and aerofoil without the light rays crossing the bow of the main aerofoil section. Storage and living compartments are arranged in the aerofoil to provide for distribution of weight therein. The invention further contemplates as an improvement in the art, a novel construction of landing and discharging apparatus for a smaller aeroplane to be received, retained or discharged from within the main aerofoil section.

Describing the invention more in detail, and with particular reference to Figs. 1 to 4, there is illustrated an aeroplane embodying a centrally positioned fuselage 1 with the usual empennage thereof including a pair of operable elevating and lowering transverse planes 2 and a vertical rudder 3, these elements being operable from within the fuselage at a convenient point.

A main plane or aerofoil section 4 of hollow construction is carried by the fuselage 1. The said main plane embodies a compartment having upper and lower skin surfaces 5 and 6 respectively with the skin walls maintained in spaced relation by the bracing ribs and struts 7 shown more clearly in Figs. 6 and 7, the general design of the aerofoil being such as to provide for the least resistance during flight.

As clearly shown in Figs. 1 to 5, retractable wing sections are associated with the lateral extremities of the aerofoil, the retractable wings being of hollow construction embodying main sections 8 having a pair of rearwardly disposed aileron sections 9 and 9' hinged to the rear edge thereof as at 10 with the sections 9 and 9' capable of independent movement relative to the wing section 8 and each other by the usual devices but operable from within the fuselage or aerofoil, the wings and ailerons being shown in Fig. 1 in dotted line position, as retracted with the outer aileron section 9' projecting laterally of the aerofoil for operation when the wing is retracted to the limit of its inward movement, the retraction of the wings reducing the air resistance of the aeroplane and also permitting the lateral control of the same. As shown in Figs. 1 and 2 the forward edge extremities of the wing sections 8 are provided with pockets 11 closed by colored glass plates or lenses 12 constituting a cage for navigation lights with a lamp 13 positioned within the cage, having a deflector 11' associated therewith to prevent the rays of the lamp from crossing the bow of the aeroplane, the construction of wing pocket further preventing the lamp rays from projecting more than two points abaft the beam of the aeroplane in any direction up or down or sidewise, the wing section 8 being of hollow construction. A pilot within the fuselage or aerofoil may easily observe the lamps 13 through the short sight tube 14 carried in the wall of the pocket 11 to ascertain whether or not the lamp is illuminated, while access to the lamp from within the wing, is attained by the provision of the hinged door section 15 in the pocket 11 as clearly shown in Fig. 2. The propulsion of the aeroplane embodies the provision of a plurality of transversely positioned motors within the aerofoil associated with a novel transmission, three operating transmissions and propellers being shown as located at each side of the fuselage, but it is intended that this invention should not be limited, as any number of motors or transmissions may be employed, these transmissions being generally shown in Figs. 1 and 3 to 5.

In the forms of the invention shown in Figs. 6 to 8, the aerofoil construction practically remains the same, but in lieu of the retractable wings and ailerons, rigid wings are associated with the aerofoil, the aerofoil being divided transversely into forward and rearward air tight compartments 84 and 85 and an intermediate compartment 86, the three compartments being separated by the forward and rearward wing bars 87 and 88 respectively. To provide for the proper ventilation of the several air compartments, and to equalize the pressure interiorly and exteriorly of the aerofoil, air supply means extends from an air pump to the forward wing bar and has a valve connection with the branch pipe 90 of the pipe 91 within the forward wing bar, said pipe 91 having a branch 92 extending into the forward compartment 84 while a valve 93 at the upper end of the pipe 91 is regulated to admit external air pressure to the pipe 91 for delivery to the forward compartment 84. The cantilever bracing of the aerofoil as shown in Figs. 6 to 8 provides angle bar braces 94 between the spaced walls of the forward and rearward wing bars. As shown in Fig. 6, the central compartment 86 is divided by a horizontal partition 95 to provide an upper storage compartment for cargo or the like while the space below the partition 95 receives a glider 96 discharged therethrough by releasing the pivot platform 97, an operating cord extending from the catch 96ª to the glider 96 for operation. As illustrated in Fig. 7, the horizontal partition 95 within the central compartment 86 provides passenger accommodations above the same while a retracting chassis is adapted to be moved into the lower section of the compartment 86, this chassis generally shown embodies a frame bar 98 having a rack bar 99 operated by a gear upon the lower end of the rotatable shaft 100 that is suitably operated by a power device illustrated by the numeral 101 and fully described in Serial 450,034, the flexible cord 70 diagrammatically illustrated as connected to the inner end of the rack bar 99 and the operating mechanism 101 associated with the shaft 100, the mechanism 101 being rendered inoperative by the flexible cord 70 at the limit of inward movement of the chassis frame 98. The bottom surface of the aerofoil is provided with a slotted opening 102 to accommodate the chassis frame 98 and the ground wheel carried thereby with the frame and wheel substantially occupying the position illustrated by dotted lines in said figure. Another feature of the invention is shown in Fig. 8 wherein a particular alighting platform 103 forming a continuation of the upper wall of the aerofoil receives the aeroplane such as 96': The platform 103 is operated by the motor 104 in an obvious (worm shaft with bevel gear) manner for lowering the aeroplane 96' onto the skid door 105 so it can be suspended within the compartment 86 by a trip hook arrangement 95', a sliding door 97' operated by the motor 97" being provided in the bottom wall of the aerofoil to permit the discharge of the aeroplane 96', upon releasing the trip hook 95'. Motors 104 and 97" are similar in construction to motor 101, which is fully described in the parent case, Patent No. 1,431,017 issued Oct. 3, 1922. Parcels, mail, bombs and other articles may be carried and discharged in a similar manner.

A wheeled chassis 106 for alighting on land is hingedly connected to the aerofoil as shown in connection with Fig. 7 and further illustrated in Fig. 3, and in lieu of the retracting means for the chassis shown in Fig. 7, the same may be operated by a flexible tube connection with a suitable power device. Where the retractable pontoons and chassis are directly connected to the aerofoil, it is necessary to modify the rib and spar construction of the aerofoil to accommodate the reception into the aerofoil of the supporting frame bars for the pontoons and chassis, this feature of the invention being shown in Figs. 9 and 9ª, the lower bracing ribs of the aerofoil having a channel groove portion 107 with the pontoon or chassis supporting frame being of the cross sectional design as illustrated at 98' for reception in the channel recesses, this provision in no manner affecting the bracing strength of the ribs and spars and wheel permitting the complete reception of the pontoon and chassis frames within the aerofoil, and utilizing the frame members to flushly close the slots in the wings.

For purposes of further stabilizing the aeroplane when traveling on water with the pontoons 34 lowered as illustrated by dotted lines in Fig. 5, wing end pontoons 108 are hinged to swing transversely of the ends of the aerofoil with the outer faces thereof curved coincident to the curvature of the bottom surface of the aerofoil with the end pontoons received in pockets provided in the bottom faces of the aerofoils when in their closed positions as indicated by dotted line in Fig. 5. The provision of upper and lower openings 103 and 97' afford emergency exits in case of danger. It is to be noted that the several motors illustrated herein for operating the doors, etc., are especially adapted for aeroplane or airship use, since they are independent of the power generator after storing energy to be used in emergency; thus, whenever an operation such as retracting a wing or closing a wing door is accomplished, the forms of motors shown have the stored energy available at all times to reverse the operation without depending upon an aeroplane, gas or electric motor.

From the above detail description of the invention, it is thought that the points of novelty fully brought out will be at once evident, it being noted that part of the resistance created by the tapering ends of the aerofoil as shown in Figs. 3 and 5 will be available as "beneficial interference" to increase the life of the outer wing sections positioned at the upper ends of the main aerofoil. The interior of the air-tight compartment is supplied sufficient air for ventilation purposes as well as inflating the pontoons, and by means of a reversible pitch propeller may be used either to increase or decrease air pressure within the aeroplane compartments or the pontoons, and further supplies air to the forward compartments 84 as shown in Fig. 8 while the valve 93 controls the internal and external air pressure on the aerofoil.

While there are herein shown and described the preferred embodiments of the invention, it is nevertheless to be understood that changes may be made without departing from the spirit and scope of the invention as claimed.

What is claimed as new is:

1. In an aeroplane, the combination of two relatively telescopic wings, an aileron on one of said wings, said aileron being divided into two independently operable sections the innermost aileron being retractable within a wing section.

2. The combination with an aeroplane wing, spars and ribs adapted to provide an internal truss for said wing, a plurality of power units rigidly attached to the said wing truss, a chassis retractable within the said wing covering and means located between the said wing spars for the retraction of said chassis.

3. The combination with the internal structure of an aeroplane wing of compartments adapted for human occupation and separated by partitions and the said partitions forming part of the wing truss for the adequate strength of the said wing.

4. The combination with an aeroplane wing having its truss wholly within its external skin of compartments partitioned completely one from the other and doors provided between the said compartments and means for circulating air between the said compartments when said doors are closed.

5. The combination within an aeroplane wing, of compartments separated one from the other by double partitions and means between the partitions for the circulation of air and means adapted to open or close the partitions to the compartments at the will of the inmates.

6. In combination with an aeroplane wing, a wing section adapted to retract within another wing section during flight, an aileron fitted to the first said wing section and said aileron being divided into two parts one of said parts retractable within said second wing section and independent means for operating each part.

7. In combination with the internal structure of an aeroplane wing, a support arranged within the said wing, a parcel or torpedo arranged in the said support, an opening in the wing normally below the said parcel, a sliding door to close said opening, power means to operate said door, and releasing means adapted to free the said parcel from the said support.

8. In combination with an aeroplane wing, an object adapted for release from said wing, a support for said object, releasing means for said object from said support, a door adapted to open for the exit of said object, power means to operate said door and means within the wing to operate the door to open and close the same.

9. In combination with an aeroplane wing, a housing provided within the said wing for a small aeroplane or glider and means for the exit of the said glider during flight.

10. In combination with an aeroplane wing, a portion of the upper surface of said wing adapted for the alighting of a smaller aeroplane and means for ingress for the said small aeroplane within the wing structure of the said aeroplane wing.

11. In combination within the internal structure of an aeroplane wing, a glider provided with flotation means, and adapted as a life preserver for rapid exit from within the aeroplane wing in case of danger and means for releasing the said glider for exit from within the said wing.

12. In combination with an aeroplane wing a lamp fitted into the forward portion of said wing so that the said wing forms a rear streamline for the said lamp, and said lamp affording an uninterrupted transparent arc from dead ahead, several degrees in several directions.

13. The combination with the streamline of an aeroplane external skin, a portion of said external skin of transparent material and a light disposed within the said external skin and adapted to shine through it, through limited arcs from dead ahead.

14. In combination with the inclosed wing of an aeroplane, two separate means of exit and entrance, one being located in the roof or overhead portion of said wing and the other opening being located in a portion other than the said roof of said wing.

15. In an aeroplane, a wing having a pocket formed in the lateral outer end thereof and a signal lamp arranged to shine uninterruptedly through several degrees and in several directions from dead ahead within said pocket.

16. In combination with an aeroplane wing, a signal lamp carried thereby with the rays of the lamp projecting laterally and forwardly of the wing, but screened from without crossing the bow thereof, said wing forming a rearward streamline for the said lamp.

17. In combination within the inclosed portions of a relatively large power propelled aircraft, a smaller aircraft provided with alighting means, and releasable means within the said larger aircraft for securing the said smaller aircraft to the said larger aircraft and holding the forward portion of said smaller aircraft in the direction of normal flight of said larger aircraft.

18. In combination with lights for an aeroplane, a lamp disposed so its light shines dead ahead, a form partially streamlining the said lamp and portions of the aeroplane wing supporting the said lamp and form and complementing said form as part of the streamline for said lamp.

19. A closed housing for an aeroplane light supported by and partially located in the aeroplane wing, the rays of said light adapted to shine from dead ahead through limited arcs in other directions.

20. In combination with an aeroplane lamp screened through certain sectors, means located in said screened portions to inspect the said lamp, from a position within the aeroplane.

21. In combination with an aeroplane light, a closed housing for the said light including a transparent sector forward of said light and an opaque aeroplane sector to rearward thereof and the outside walls of said opaque sector tapering rearwardly until they substantially meet.

22. In combination with an aircraft, a side light therefor and arranged to shine upwardly and downwardly through substantially the same sectors as sidewise and screened by the aircraft structure from shining through certain sectors.

In testimony whereof I affix my signature.

JAMES V. MARTIN.